Patented Feb. 15, 1949

2,461,505

UNITED STATES PATENT OFFICE 2,461,505

REMOVAL OR REPLACEMENT OF ELECTROLYTES IN PHYSIOLOGICALLY ACTIVE MATERIALS

Frederick K. Daniel, Kew Gardens, N. Y., assignor, by mesne assignments, to Sun Chemical Corporation, New York, N. Y., a corporation of Delaware No Drawing. Application December 2, 1944, Serial No. 566,403

4 Claims. (Cl. 167—78)

The present invention is concerned primarily with the refinement or purification of proteinaceous and other colloidal substances of high molecular weight, and particularly physiologically active organic materials or biological preparations including immunological sera and enzymes that are sensitive to chemicals and to heat.

In the preparation of immunological sera for example, that constituent of the blood, such as the globulin, which contains the anti-toxin is commonly precipitated out by a salt such as ammonium sulphate. The precipitate, when thereupon dissolved in water, therefore contains in solution a substantial proportion of ammonium sulphate or other salt which is injurious to the organism into which the serum is to be introduced and such electrolyte must be removed therefrom before the serum can be used.

Variations in pH and in temperature incidental to chemical treatment for removal of such objectionable electrolyte from sera or the like, leads to jelling or coagulation of the proteinaceous ingredient thereof, with consequent loss in efficacy.

While physical or physico-chemical procedures, such as dialysis for instance, will serve for extracting the objectionable electrolyte from the serum preparation without the foregoing difficulties, the procedure is expensive, by reason of the fact that dialytic separation becomes very slow and inefficient, once the electrolyte content has been brought down to the neighborhood of one per cent and such process would have to be carried on for days to eliminate the electrolyte to sufficient extent. Moreover, in such prolonged dialysis the product becomes excessively diluted with water, and does not admit of reconcentration without some degree of jeopardy to the active proteinaceous constituent, due to the tendency of the latter to jell under heat or in the presence of drying agents. Even where continuous dialysis is resorted to for the purpose, 12 to 24 hours are required sufficiently to reduce the electrolyte content. Moreover, in dialysis, whether by batch or by continuous operation, certain biologically inactive impurities that are frequently present in the crude serum and that cause discoloration thereof, remain in the serum and that is also true of other compounds present in the serum, that are of high molecular weight, of acidic or basic nature and that are useless diluents, if not positively objectionable in the serum.

Where it is attempted to remove large proportions of objectionable electrolyte according to an ion exchange practice that has heretofore been conventional for other purposes, the procedure would be uneconomical because of the need to regenerate the exchanger at frequent intervals and the operation would be inefficient because much of the preparation in the connecting conduit between the cation and anion exchange would not be acted upon. Moreover, acid medium used in the cation exchange bed would acidify and cause jelling of the protein ingredient of the preparation with consequent clogging of the ion exchanger and inhibition of its further operation.

Where it is attempted to pass the preparation through such ion exchanger of duplex type, having an admixture of cation and anion exchange particles in the same bed, the process would be prohibitive in cost, since any attempt to regenerate such duplex ion exchanger in situ would fail because the acid activator for the cation exchange particles would be neutralized by the alkali activator for the anion exchanger.

It is among the objects of the invention to provide an efficaceous and relatively speedy physico-chemical treatment of crude sera and other biological preparations for substantially complete removal therefrom of objectionable electrolyte, as well as of any other impurities that are incapable of being removed by dialysis, including such as cause discoloration of the product, all without waste of treating materials and without excessive dilution of the refined product, or jelling, coagulation or other objectionable effect upon the proteinaceous ingredient.

According to the present invention electrolyte, if present in the crude preparation in proportions of one per cent or less, is effectively removed by a novel ion exchange method, and for certain purposes it is not only removed but is replaced by a biologically harmless or beneficial salt, such as sodium chloride, in amount not to exceed isotonic proportions.

For the first of these alternative procedures, that is, for the removal of the electrolyte without replacement by another salt, a duplex ion exchanger is used in which the cation and anion exchange particles are admixed in a single column. The cation particles having been activated with an acid, desirably hydrochloric acid, and the anion particles with an alkali, desirably sodium hydroxide or sodium carbonate, the preparation passed through the exchanger gives up its electrolyte, such as ammonium ion on the cation and sulphate ion on the anion exchange material. By virtue of the intimate admixture of the two components of exchange material in a column, the period during which the biological preparation passed therethrough is subjected to an excess of free hydrogen ions is so short that no harmful effect, such as jelling of the proteinaceous ingredient results, and satisfactory demineralization of the biological preparation takes place. The efflux is substantially free from salt and is neutral in reaction. When the efflux shows more than minor proportions of the objectionable electrolyte, the ion exchanger becomes inoperative for purposes of the present invention.

One of the objects of the invention is to provide a method of regenerating an ion exchanger of the above type that is economical in materials and labor, and particularly in the cost of regenerant, the amount of distilled water required for washing, and the amount of equipment and plant space required for output on a commercial scale.

According to the present invention, there is provided means for mechanically separating the cation from the anion batch of granules so that each may be regenerated separately. This is accomplished by using cation exchange granules that differ from the anion exchange granules in a measurable physical magnitude and subjecting the granules to a physical separating agency so graded as to act upon the granules of one magnitude and to be relatively inert to those of the other magnitude.

In one specific embodiment, the two exchange elements are of granules having different specific gravity and the separation is effected by flotation of the lighter particles in a liquid solution non-reactive with said granules and of intermediate specific gravity, in which the heavier granules sink to the bottom.

In another specific embodiment, the two exchange elements are of granules having different sizes so that the cation exchange granules may be readily separated from the anion exchange granules by passing the material through a screen.

After washing the granules that have thus been separated by one or the other of said methods, they may be regenerated separately, the cation exchange granules with acid, such as hydrochloric acid and the anion exchange granules with alkali, such as sodium hydroxide or sodium carbonate. After washing and remixing said two batches of reactivated granules, the bed is ready for reuse.

In the other embodiment of ion exchanger, not only is the objectionable electrolyte removed, but a salt is substituted that is compatible with or beneficial to the organism into which the biologic preparation is to be injected or otherwise introduced.

If two separate columns were used for that purpose, one as an anion exchanger and the other as a cation exchanger, there is always a certain amount of the biological preparation which remains in the connecting lines and in the interstices of the gravel bed underlying the exchange bed and in the layer just above the exchange material. The presence of such connecting line and the duplication of gravel beds and of layers above the exchange beds results in a considerable amount of material that is not participating in the exchange reaction and is handled needlessly which, among other undesirable features, also leads to greater dilution of the final product or to loss of active material. For this reason, it is much to be preferred to use a duplex bed containing both cation and anion exchangers.

The present embodiment is based on the fact that sodium chloride is not harmful to most biological preparations. In fact, many preparations injected into the body should contain an isotonic solution of sodium chloride in order not to have an adverse physiological effect. An isotonic salt solution is one that contains about 0.9 per cent sodium chloride, as is well known. In many cases it is, therefore, acceptable to replace salts of a detrimental type with sodium chloride, as long as the concentration of the latter does not exceed 0.9 per cent.

It is known that the adsorption of sulphate from sulphuric acid is greater than that of chloride from hydrochloric acid and that, therefore, the chloride ion adsorbed on an ion exchange material can be replaced by the sulphate ion if sulphuric acid is fed through an anion adsorbent previously loaded with hydrochloric acid. In this way, the anion material acts as a true anion exchanger and not as an acid adsorbent, retaining the entire molecule as occurs in the customary demineralization procedure. When anion exchange materials are used in such manner, the regeneration is carried out by adding proper amounts of hydrochloric acid to the exchange material. The exchange material is then ready to be used once more.

In the present embodiment, neither acid nor alkali is used as the activating agent, but both cation and anion exchangers are activated by use of a substantially dissociated salt solution, desirably a solution of neutral salt, preferably sodium chloride. Were the problem one of exchanging anions only, the discovery that the anion exchanger used in the $Cl^-$ - $SO_4^{--}$ cycle does not have to be regenerated with acid but can be regenerated with such salt solution, would be of little significance. However, the present discovery is of paramount importance in permitting the exchange of both cations and anions concurrently in a very much better way than was heretofore thought possible.

When the serum with its objectionable electrolyte, say of ammonium sulphate, is passed into the exchanger, the ammonium ion will attach to the cation exchanger, releasing the sodium ion therefrom and the sulphate ion will attach to the anion exchanger releasing the chlorine ion therefrom so that sodium chloride will thus appear in the effluent in place of the ammonium sulphate electrolyte that has been taken up by the exchanger in the flow of the crude preparation therethrough.

When the serum is to be injected into the human system, it is important in this application that the objectionable electrolyte to be removed, be in proportion no greater than the corresponding molecular proportion of the beneficial salt which is to be substituted therefor. Where sodium chloride is to be in the refined serum, it must be in proportion no greater than the isotonic proportions of 0.9 per cent previously noted. The objectionable electrolyte to be replaced by the exchanger must, therefore, be in amount no greater than the corresponding molecular proportions of sodium chloride, as otherwise the sodium chloride would exceed the isotonic proportions. If the objectionable electrolyte in the crude preparation be less than the molecular equivalent of the isotonic proportions of sodium chloride, more of the latter would be added to the efflux to make up the difference for precisely accurate isotonic proportions of such salt in the final refined preparation.

The neutral salt containing both anion and cation of the desired type, in the particular case referred to above, sodium chloride, can thus be used as a regenerant. The same sodium chloride will replace the detrimental anions and cations simultaneously, and thereby effect important savings. It allows the two exchangers to be mixed and to be used in a single duplex bed which can be regenerated in situ.

While the main purpose of the ion exchange treatment in either embodiment is to remove the objectionable electrolyte, such treatment has the further utility of removing biologically inactive impurities that cause discoloration of the serum and also of removing certain compounds of acidic or basic nature and of high molecular weight that are sometimes present in the crude serum and none of which constituents is capable of being removed by dialysis. Accordingly, the product resulting from the treatment above set forth is purer and more concentrated than that attainable by dialysis alone, regardless of how long that process be carried on. The present method thus affords a procedure that results in a product at least as satisfactory in all respects and in some respects more satisfactory than could be attained by dialysis for four to twenty times the length of treatment required by the present invention.

It will be understood that prior to regeneration, distilled water is passed through the exchange column in amount but little greater than the interstitial spaces in the column, thereby to recover therefrom the refined active preparation without excessive dilution thereof.

Both of the foregoing methods of regeneration of the ion exchanger are of course useful regardless of the character of material being treated thereby.

Where the crude biological preparation has an objectionable electrolyte content much in excess of one per cent, say of 10 or 12 per cent, the foregoing process in either embodiment, whether to produce a serum free from electrolyte or to produce one with isotonic proportions of sodium chloride, could be carried out after removing the bulk of the objectionable electrolyte by dialysis, preferably in a continuous counter current manner. In such dialysis as is known, the great bulk of the electrolyte can readily be removed in a few hours of treatment. In practice the filter cake constituting the precipitated blood constituent with the active agent therein and the precipitating salt such as ammonium sulphate is suspended in as little water as required for preventing sedimentation of the proteins and this liquid is fed into the alternate cells of a countercurrent dialysis apparatus and dialyzed against water for a period in the order of three hours. In such dialysis, the great bulk of the ammonium sulphate or other salt is dialyzed out and the precipitated blood component is dissolved so that a solution then results, in which the ammonium sulphate or other salt content is not greater than one per cent and may be conveniently subjected to the ion exchange treatment according to either of the methods above set forth.

Thus, according to the present invention, the preparation, if initially of low electrolyte content of one per cent or less, need merely be subjected to the ion exchange treatment according to one or the other method above set forth, and if of higher content, it would first be subjected to dialysis, preferably to continuous counter-current dialysis to bring its electrolyte content down to one per cent or less before subjecting it to the ion exchange treatment.

In conformity with the statutory requirements, specific examples will now be given of the two alternative procedures above set forth:

I. Demineralization method

It is assumed that the crude preparation to be refined has an objectionable electrolyte content of one per cent or less or has first been dialyzed to such low electrolyte content.

A cation exchange resin derived from a polyhydric phenol and formaldehyde, and in the form of a homogeneous gel is activated with a mineral acid, such as hydrochloric acid and washed free of excess acid. This exchange resin which has specific gravity greater than 1.26 is mixed with anion exchange resin or adsorbent derived from an aromatic or aliphatic amine and formaldehyde, and in the form of a homogeneous gel, of specific gravity less than 1.26, which has been activated with sodium hydroxide or sodium carbonate solution and also washed. The mixed resins are transferred into a column having a screen and a gravel bed over a bottom outlet. A biologically active preparation containing ammonium sulphate is fed through this column downward and the effluent is collected until the first signs of ammonium sulphate breakthrough appear. Distilled water is then passed through the column until the serum contained in the interstices has been recovered.

For separating the cation from the anion exchange particles by one method, the column is drained and all of the resinous material is then washed onto a strainer by a stream of water entering the column from the bottom. After the resin on the strainer is drained properly, it is transferred into a vessel containing enough of a sugar solution of the specific gravity 1.26 or a little higher to allow the resins to flow freely therein. This sugar solution is preferably warmed to 50° to 70° C. so that its viscosity is lower than it would be at room temperature. The liquid suspension is then stirred and allowed to settle. The heavier cation exchange resin will go to the bottom and the lighter anion exchange resin will go to the top, where it is skimmed off. After the top fraction is removed, the suspension is stirred once more so that the small proportion of anion exchange resin which may have been carried down with the cation exchange resin has an opportunity to separate and also to go to the top, where it is then skimmed off as the bulk was before.

When all the anion exchange resin is thus removed, the sugar solution is drained off ready for re-use and the cation exchange resin is recovered from the bottom. The two separated resins are then simply washed with water to remove the remaining sugar. These resins can then be regenerated in the customary manner by the use of mineral acid and alkali respectively. After the resins are regenerated and washed, they are ready for re-use in the combined column, as described above.

In the alternative arrangement above referred to for separating the cation from the anion exchange particles, the former are of larger size than the latter. Desirably, none of the cation exchange resin should pass a 40-mesh screen and all of the anion exchange resin should pass such screen. The cation exchange resin should preferably have granules no larger than 20-mesh and the anion exchange resin granules no smaller than 60-mesh. Thus, when the contents of the spent duplex ion exchange column are washed through a 40-mesh screen the separation immediately occurs and the separate resins can then be regenerated in the customary manner as above indicated, and after washing thereof, the material is ready for re-use.

II. Producing preparation with isotonic proportion of sodium chloride

A crude immunological preparation such as a diphtheria antitoxin solution prepared in the customary way and containing say 12% ammonium sulphate is suspended in distilled water, and dialyzed in a continuous countercurrent manner, the water flowing downward only and the antitoxin flowing upward.

The antitoxin solution is fed into the dialyzer at such a rate that it will stay in the dialyzing cells for three hours from the time it enters the dialyzer until the time it leaves the dialyzer. During the dialytic process, dilution takes place in the serum cells, causing an increase in the original volume of about 60 per cent. The serum leaving the dialyzer has an ammonium sulphate content of just about 1 per cent.

The dialyzed serum to be treated is fed through a column consisting of a mixture of 52 parts by volume of cation exchange resin to 48 parts of anion exchange resin, both previously regenerated with sodium chloride and washed free of salt. The dialyzed serum is fed at such a rate that the material stays in contact with the exchange bed for from twelve to fifteen minutes, or even less, from the time it enters the column until it leaves this column. The effluent contains substantially no ammonium sulphate but an equimolecular amount of sodium chloride.

The exchange column consisting of these two resins in the proportions mentioned, holds about 62 parts by volume of water in the interstices. Consequently, when the serum is fed into this column, the first 62 parts of effluent containing none of the active ingredients are discarded. After a total of 125 parts of the dialyzed diphtheria serum has been fed into the exchange column, 72 parts of distilled water are passed through. This amount of water is sufficient to recover all the biologically active material from the column, that is, 62 parts to replace the biological liquid held in the interstices, plus another 10 parts for "washing."

In this instance the antitoxin is thus diluted only by 8 per cent over and above the dilution effected during the previous dialysis procedure. The ammonium sulphate content of the total effluent is below 0.04 per cent, that is to say, more than 96 per cent of the ammonium sulphate remaining in the previously dialyzed preparation has been taken out and replaced by sodium chloride. In place of .96 gm. of ammonium sulphate, .84 per cent of sodium chloride are found in the effluent. This represents an almost isotonic concentration of salts.

Where the serum has been dialyzed somewhat more than above indicated, a greater volume of the dialyzed antitoxin could be poured through an exchange bed of the same capacity. In every instance, however, a satisfactory purification has been carried out and exchange of the undesirable electrolyte has been effected in less than six hours from the moment the antitoxin entered the dialyzer to the time the finished effluent left the exchange bed.

As many changes could be made in the above process and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. The method of refining acid sensitive biological fluid preparations of the character that have a deleterious electrolyte content, said electrolyte consisting of cation replaceable by sodium ion and anion replaceable by chloride ion, which consists in passing the preparation through a duplex ion exchanger comprising two sets of salt activated resin particles mixed together, one set serving as an anion and the other as a cation exchanger, and thereupon regenerating both sets of resin particles of the exchanger without separation of said mixed resin particles by flowing therethrough substantially dissociated sodium chloride solution preparatory to reuse of the exchanger.

2. The method of refining a crude acid sensitive biological fluid preparation that contains deleterious electrolyte in quantities no greater than the molecular equivalent of sodium chloride in isotonic proportions, said deleterious electrolyte consisting of cation replaceable by sodium ion and anion replaceable by chloride ion, to render the same substantially free from such deleterious electrolytes, which consists in passing the crude preparation through a duplex ion exchanger including intermixed cation and anion exchange granules activated with sodium chloride, and when the ion exchanger is substantially spent, washing out the preparation from the interstices thereof by distilled water in quantity substantially only sufficient for the purpose and thereupon regenerating both sets of resin particles of the ion exchanger without separation of said intermixed cation and anion exchange granules by washing it and passing sodium chloride solution therethrough.

3. The method of completing the refinement of acid sensitive biological fluid preparations that contain deleterious electrolyte, said electrolyte consisting of cation replaceable by sodium ion and anion replaceable by chloride ion which consists in dialyzing the preparation against water to remove the bulk of the electrolyte and to leave in the preparation no more than the molecular equivalent of isotonic proportions of sodium chloride thereupon removing substantially all of the residue of said electrolyte by passing the preparation through a duplex ion exchanger including cation and anion exchange granules in admixture and activated with sodium chloride, and thereupon reactivating simultaneously both sets of resin particles of the ion exchanger without separation with sodium chloride preparatory to reuse thereof.

4. A process of treating a diphtheria antitoxin solution containing ammonium sulphate which comprises dialyzing the solution to reduce the amount of ammonium sulphate therein and subjecting the dialyzed material to an exchange reaction with an admixture of exchange resin materials including a cation exchange resin and an anion exchange resin to replace the ammonium ions with alkali metal ions and the sulphate ions with chloride ions, said resin material having been previously activated with sodium chloride and thereupon reactivating the mixture of resins by passing a solution of sodium chloride through said mixture preparatory to re-use thereof.

FREDERICK K. DANIEL.

(References on following page)

REFERENCES CITED

The following references are of record in the file of this patent:

UNITED STATES PATENTS

| Number | Name | Date |
|---|---|---|
| 2,074,493 | Swingle | Mar. 23, 1937 |
| 2,275,210 | Urbain | Mar. 3, 1942 |
| 2,364,639 | Maizel | Dec. 12, 1944 |
| 2,366,650 | Rawlings et al. | Jan. 2, 1945 |
| 2,368,464 | Gerlough | Jan. 30, 1945 |
| 2,368,926 | Block | Oct. 16, 1945 |

OTHER REFERENCES

Ser. No. 395,575, Smit (A.P.C.), Pub. May 11, 1943.